Figure 1:
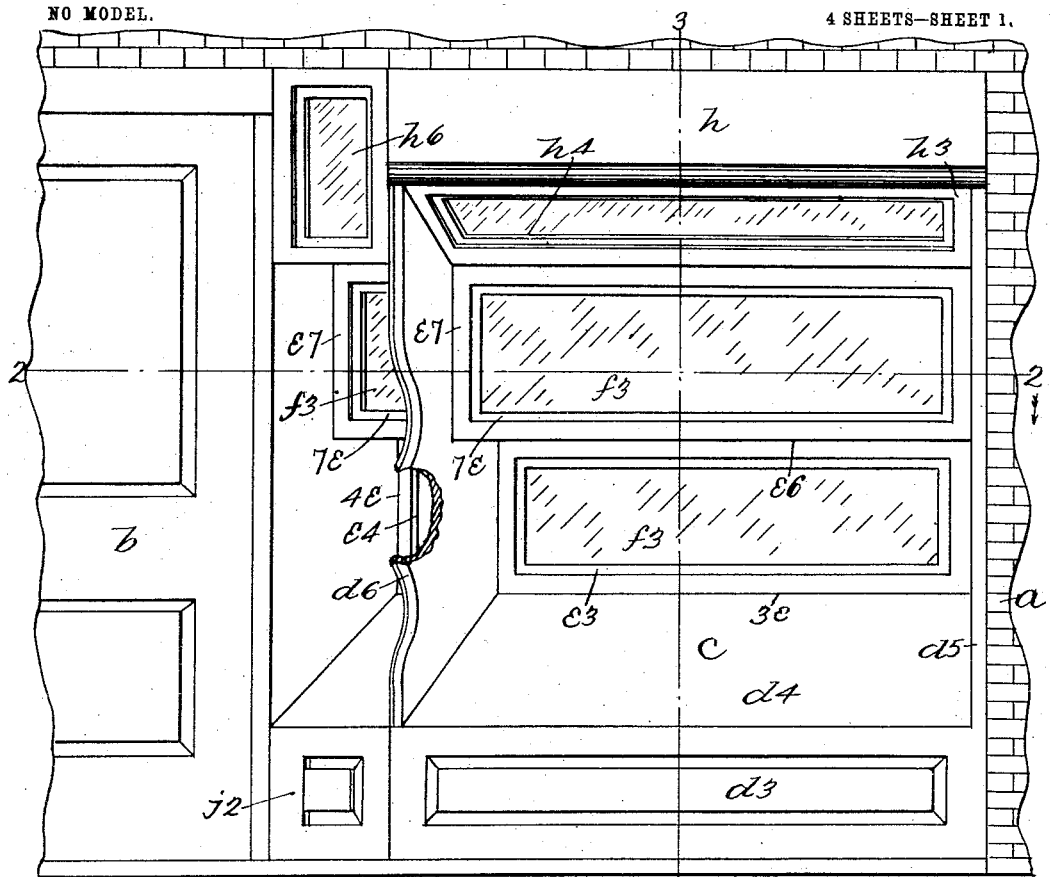

No. 749,678. PATENTED JAN. 12, 1904.
G. F. JEFFERSON.
SHOW WINDOW.
APPLICATION FILED APR. 10, 1903.
NO MODEL. 4 SHEETS—SHEET 1.

WITNESSES
J. C. Larsen
F. A. Stewart

INVENTOR
George F. Jefferson
BY Edgar Tate & Co
ATTORNEYS

No. 749,678. PATENTED JAN. 12, 1904.
G. F. JEFFERSON.
SHOW WINDOW.
APPLICATION FILED APR. 10, 1903.
NO MODEL. 4 SHEETS—SHEET 2.
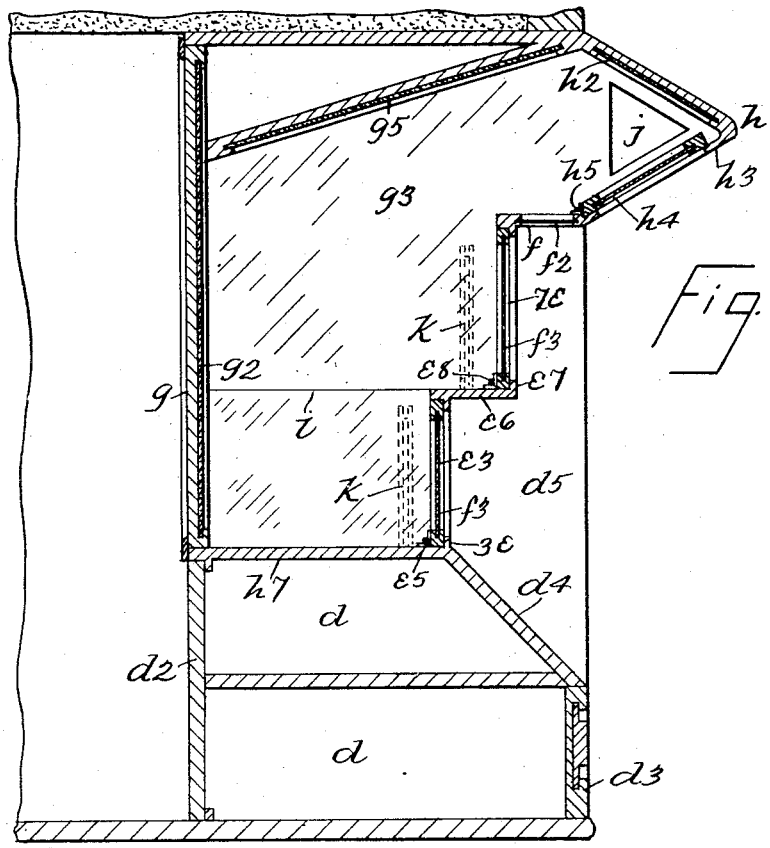
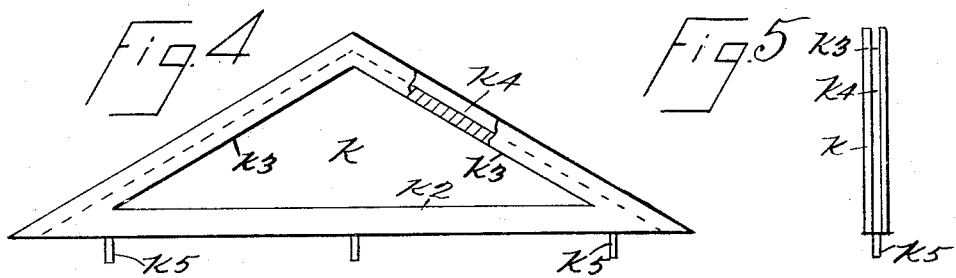
WITNESSES
J. C. Larsen
F. A. Stewart
INVENTOR
George F. Jefferson
BY
Edgar Tate & Co
ATTORNEYS No. 749,678. PATENTED JAN. 12, 1904.
G. F. JEFFERSON.
SHOW WINDOW.
APPLICATION FILED APR. 10, 1903.
NO MODEL. 4 SHEETS—SHEET 3.

WITNESSES
J. C. Larsen
F. A. Stewart

INVENTOR
George F. Jefferson
BY
Edgar Tate & Co
ATTORNEYS

No. 749,678. PATENTED JAN. 12, 1904.
G. F. JEFFERSON.
SHOW WINDOW.
APPLICATION FILED APR. 10, 1903.
NO MODEL. 4 SHEETS—SHEET 4.

WITNESSES
J. C. Larsen
F. A. Stewart

INVENTOR
George F. Jefferson
BY Edgar Tate & Co.
ATTORNEYS

No. 749,678.

Patented January 12, 1904.

UNITED STATES PATENT OFFICE.

GEORGE F. JEFFERSON, OF BROOKLYN, NEW YORK.

SHOW-WINDOW.

SPECIFICATION forming part of Letters Patent No. 749,678, dated January 12, 1904.

Application filed April 10, 1903. Serial No. 151,945. (No model.)

*To all whom it may concern:*

Be it known that I, GEORGE F. JEFFERSON, a citizen of the United States, residing at Brooklyn, in the county of Kings and State of New York, have invented certain new and useful Improvements in Show-Windows, of which the following is a specification, such as will enable those skilled in the art to which it appertains to make and use the same.

The object of this invention is to provide an improved show-window for use by jewelers and other dealers for the display of goods to be sold; and with this and other objects in view the invention consists in a show-window constructed as hereinafter described and claimed.

The invention is fully disclosed in the following specification, of which the accompanying drawings form a part, in which the separate parts of my improvement are designated by suitable reference characters in each of the views, and in which—

Figure 2:
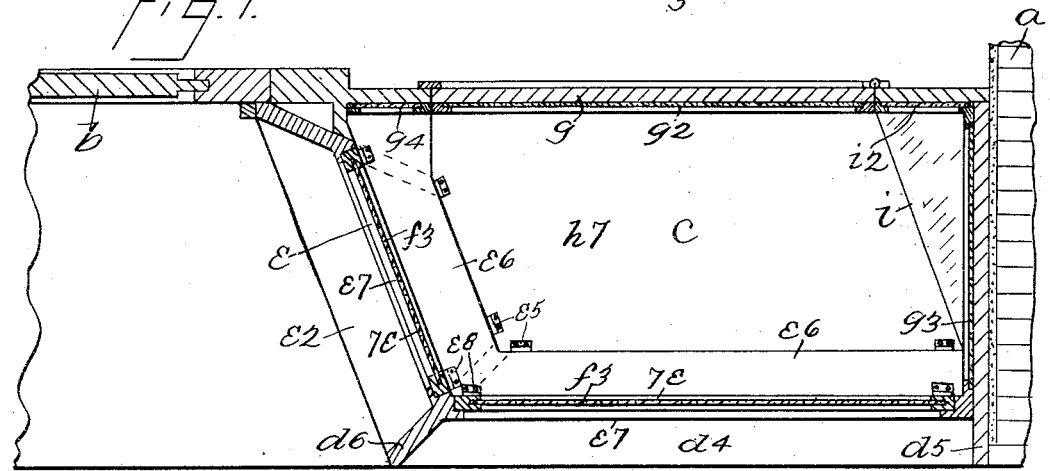
Figure 6:
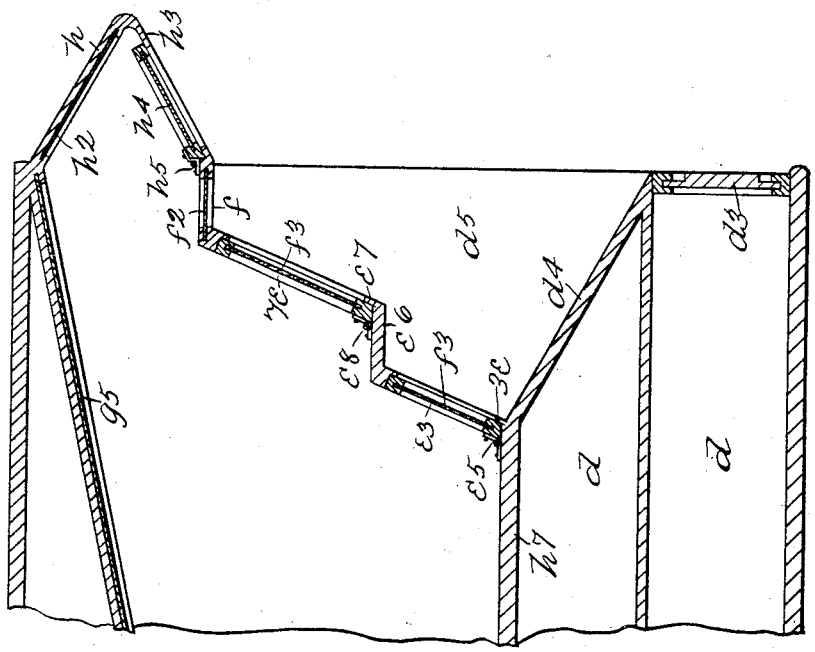
Figure 7:
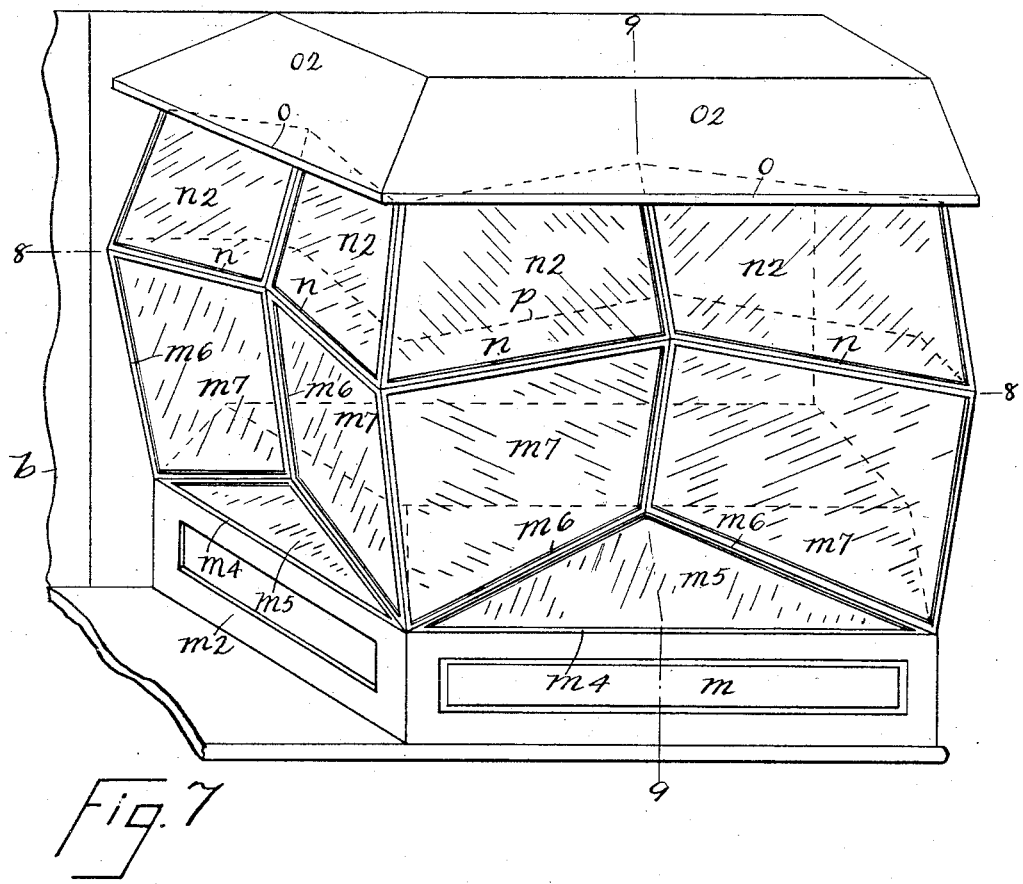
Figure 8:
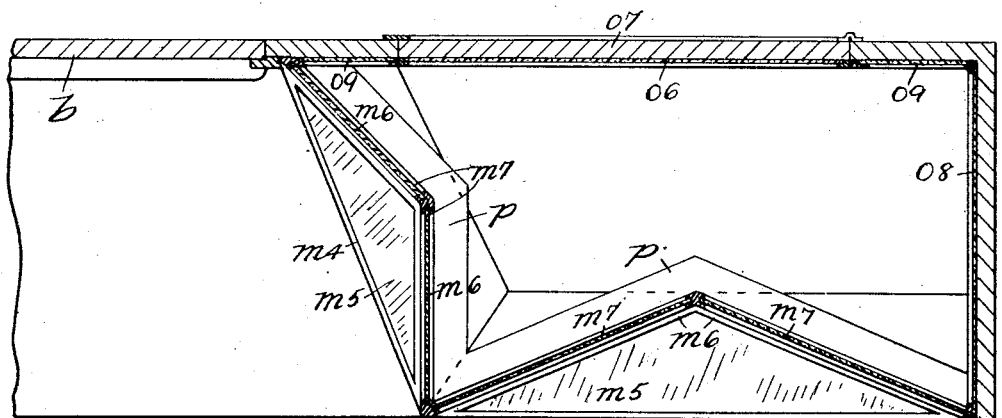

Figure 1 is a front view of a part of the building provided with my improved show-window; Fig. 2, a horizontal section on the line 2 2 of Fig. 1; Fig. 3, a vertical section on the line 3 3 of Fig. 1; Fig. 4, a front view of a display device which I employ for holding price and show cards, and Fig. 5 an end view thereof; Fig. 6, a view similar to Fig. 3, showing a modification; Fig. 7, a perspective view showing another modification; Fig. 8, a section on the line 8 8 of Fig. 7, and Fig. 9 a section on the line 9 9 of Fig. 7.

In the drawings forming part of this specification I have shown at $a$ a part of the front wall of a house, in which is placed a door $b$ and at one side of which is my improved show-window $c$. The show-window $c$ consists of a casing or frame in the bottom of which are drawers or receptacles $d$, which are permanently closed at the front and provided at the rear with a door or other closing device $d^2$, and the front wall of the bottom drawer or receptacle $d$ is vertical, as shown at $d^3$, while the front wall of the top drawer or receptacle $d$ is inclined upwardly and backwardly, as shown at $d^4$, and this wall $d^4$ forms the sill of the main or front portion of the show-window, and the right-hand frame or wall $d^5$ of the show-window in the form of construction shown is vertical and at right angles to the wall of the building, while the left-hand wall or frame member $d^6$ is arranged at an angle to the front wall of the building of preferably about forty-five degrees, and this left-hand wall or frame member $d^6$ in the form of construction shown extends outwardly flush with the front wall of the building. The end of the show-window adjacent to the door is inclined, as shown at $e$, at an angle to the front portion of the window and the front wall of the building, as clearly shown in Fig. 2, and a portion of the wall or frame member $d^6$ projects beyond the window proper both at the front and the left-hand end, and the left-hand end of the window is also provided with a downwardly-inclined sill portion $e^2$.

The bottom portions of the show-window proper, both front and at the left-hand end, consist of frames $3^e$ and $4^e$, in which are placed panels $e^3$ and $e^4$, which are hinged at the bottom, as shown at $e^5$, and adapted to swing inwardly, and over these are placed outwardly-directed frame boards or members $e^6$, over which are placed other frame members $e^7$, in which are placed panels $7^e$, which are also hinged at the bottom, as shown at $e^8$, and adapted to swing inwardly, and over the frame members $e^7$ are placed outwardly-directed frames $f$, in which are placed transparent panels of glass or other material $f^2$, and the panels $e^3$, $e^4$, and $7^e$ are also provided with transparent members $f^3$.

The show-window is provided with a rear door $g$, in the front of which is placed a mirror $g^2$, and the right-hand side wall is also provided with a mirror $g^3$, while the back of the left-hand end portion is also provided with a mirror $g^4$ and in the top of the show-window is placed another mirror, $g^5$. The top front portion of the window projects outwardly over the frame members $3^e$, $e^7$, and $f$, as shown at $h$, and in the top of this projection $h$, which is inclined outwardly and forwardly, is placed a mirror $h^2$, and in the bottom $h^3$ thereof, which is inclined downwardly and backwardly, is placed a widow-frame $h^4$, hinged at $h^5$ so as to swing inwardly and backwardly, and in the top portion of the window adjacent to the door and corresponding with the forwardly-directed or overhanging portion $h$ is a frame and transparent panel $h^6$.

The parts $e^6$ at the front and left-hand end of the window or window-frame serve as shelves on which various articles may be placed, and the bottom portion $h^7$, which forms the top of the upper drawer or space $d$, also serves as a shelf on which various articles may be placed, and at the end of the window is a triangular raised portion $i$, which also serves as a shelf and over the top of which and on the inner wall of which are placed mirrors, and at the rear of the shelf is another mirror $i^2$.

The top portion $g^5$ of the window is downwardly and backwardly inclined, as shown in Fig. 3, and the ends of the overhanging or projecting portion at the top of the window are provided with transparent panels $j$, which admit light freely to the upper portion of the show-window, and the transparent panels, which are hinged at $h^5$, $e^8$, and $e^5$, also admit light freely to the interior of the window, and the object of hinging these panels in the manner described is to facilitate the cleaning of both sides thereof from the inside of the window.

At the bottom of the left-hand end portion of the window is a casing $j^2$, forming a receptacle which also opens backwardly similar to the drawers or receptacles $d$, or the drawers or receptacles $d$ may be extended beneath the left-hand end portion of the window, as will be readily understood. I also employ display-frames $k$, which are triangular in form, as shown in Figs. 4 and 5, and comprise a base portion $k^2$ and two inclined members $k^3$, and the inclined members $k^3$ are slotted on their upper sides, as shown at $k^4$, and the base member $k^2$ is provided with dowel-pins $k^5$, and these dowel-pins are adapted to enter the frame members $e^6$ and $h^7$, and in Fig. 3 I have indicated in dotted lines the position in which these display-plates are placed when used, and in practice the prices and other cards are stuck into the grooves $k^4$ in these frames and supported thereof rearwardly of the transparent panels $f^3$.

The construction shown in Fig. 6 is similar in all respects to that shown in Fig. 3, with the exception that the frame members $3^e$ and $e^7$ are set at an inclination and the panels $e^3$ and $7^e$ correspondingly inclined, and it will be understood that the corresponding parts in the left-hand portion of the show-window may be similarly set at an inclination.

Figure 9:
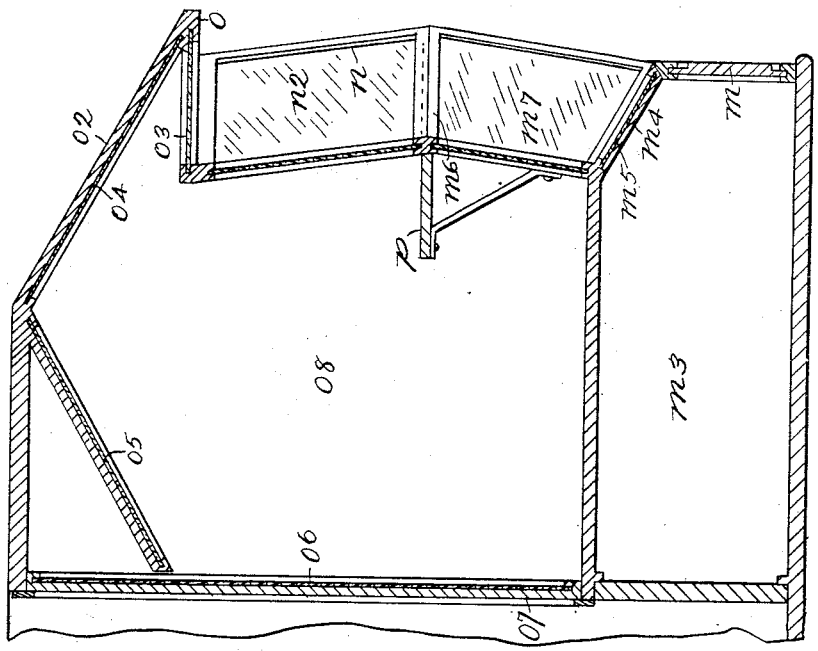

In the form of construction shown in Figs. 7, 8, and 9 the front of the show-window is provided with a base $m$ and the end adjacent to the door with a corresponding base $m^2$, and these base portions may be provided with drawers or receptacles $m^3$, as shown in Fig. 9. Over the base portions $m$ and $m^2$ are inclined sills $m^4$, containing mirrors $m^5$, and the show-window proper over the inclined sills $m^4$ consists of bottom panel-frames $m^6$ both at the front and at the end adjacent to the door and in which are placed transparent panels $m^7$, and the panel-frames $m^6$, both at the front of the show-window and at the end adjacent to the door, are inclined inwardly and backwardly, and the top portions thereof are inclined outwardly, and over the panel-frames $m^6$, both at the front of the show-window and at the end adjacent to the door, are placed panel-frames $n$, which are inclined inwardly and backwardly, and the top portions of which are also inclined backwardly, and these panel-frames also contain transparent panels $n^2$. Over the show-window, both at the front and the end adjacent to the door, is a projecting ledge $o$, the bottom portion of which is horizontal and the top portion of which is inclined upwardly and backwardly, as shown at $o^2$, and placed in the bottom horizontal portion of the ledge $o$ is a transparent panel $o^3$, and in the bottom of the inclined portion $o^2$, which extends upwardly and backwardly over the show-window, is placed a mirror $o^4$. At the top back portion of the show-window is placed an inclined mirror $o^5$, and in the extreme back or in the back wall of the show-window is another mirror, $o^6$, and this back wall preferably consists of a door $o^7$, this construction being best shown in Fig. 9, while at the right-hand end of the show-window is placed a mirror $o^8$, and the interior back wall of the entire show-window, as well as the door $o^7$, is also provided with a mirror or mirrors, as shown at $o^9$ in Fig. 8.

Arranged rearwardly of the panel-frames $m^6$ and $n$ and at the point where these frames meet is a horizontal shelf $p$, and this shelf extends entirely around the front portion of the show-window and the end thereof adjacent to the door, and any number of shelves or supports may be placed within this window at suitable points, and various articles may be displayed therein in any manner desired. In each of the forms of construction shown it will be seen that almost the entire front portion of the show-window, as well as the end thereof adjacent to the door, is composed of light framework and transparent panels, and in each form of construction there is an overhanging ledge, and in each form of construction, between the bottom and upper panels or frames of the window proper, is a ledge or shelf for the support of articles to be displayed, this shelf or ledge being shown at $p$ in Figs. 8 and 9 and at $e^6$ in Figs. 3 and 6. It will also be seen that the arrangement of mirrors within the show-windows is practically the same in each of the forms of construction shown and that the construction of the front of the show-window and the end thereof adjacent to the door in each of forms of construction shown consists of light panel-frames, in which are placed transparent panels and over which is a horizontal member having a transparent panel.

My invention is not limited to the material employed, and the panel-frames may be made either of metal or wood, and the transparent panels may also be composed of any desired material.

In the construction shown the window is set back into the wall of the building, while the door *b* is also set back into the building; but this arrangement is not essential, and the front wall of the building may, if desired, be flush with the door and its frame, in which event the entire show-window will project, as will be readily understood, and both ends thereof might be made similar to the ends adjacent to the door.

In addition to the mirrors arranged within the show-windows, as herein shown and described, all the interior woodwork portion thereof may be provided with mirrors or reflectors and also with transparent shelves supported in any desired manner.

Having fully described my invention, what I claim as new, and desire to secure by Letters Patent, is—

1. A show-window comprising a front portion and an inclined end portion and a plurality of subdivisions arranged one above another, the bottom subdivisions being provided with a downwardly-inclined sill and the top subdivisions being projected, said window being also provided with a projecting top portion both at the front and inclined end thereof, substantially as shown and described.

2. A show-window comprising a front portion and an inclined end portion and a plurality of subdivisions arranged one above another, the bottom subdivisions being provided with a downwardly-inclined sill and the top subdivisions being projected, said window being also provided with a projecting top portion both at the front and inclined end thereof, and the inclined sill, the projecting top portion, the back of the window, one end thereof, and the top thereof being also provided with mirrors, substantially as shown and described.

3. A show-window comprising a front portion and an inclined end portion and a plurality of subdivisions arranged one above another, the bottom subdivisions being provided with a downwardly-inclined sill and the top subdivisions being projected, said window being also provided with a projecting top portion both at the front and inclined end thereof, and the inclined sill, the projecting top portion, the back of the window, one end thereof, and the top thereof being also provided with mirrors, and the bottom of the projecting top portion being provided with a transparent panel, substantially as shown and described.

4. A show-window comprising a front portion and one end of which is inclined backwardly, said front and end being provided with downwardly-inclined sills having mirrors, the body portion of said window comprising separate projecting divisions or panels, and the top thereof being provided with a projecting portion having a mirror in the cover and transparent panels in the bottom thereof, one end of the window and the back and top portion of the interior being provided with mirrors, substantially as shown and described.

5. A show-window composed of separate divisions arranged one above another and successively projected outwardly one above another, the bottom portion of the bottom divisions and of the outwardly-projected divisions thereover forming shelves and said divisions being provided with hinged transparent panels which are adapted to open inwardly, substantially as shown and described.

6. A show-window composed of separate divisions arranged one above another and successively projected outwardly one above another, the bottom portion of the bottom divisions and of the outwardly-projected divisions thereover forming shelves and said divisions being provided with hinged transparent panels which are adapted to open inwardly, and the bottom portion of the top division which is projected outwardly being partially horizontal and partially upwardly inclined and said portions being also provided with transparent panels one of which is adapted to swing inwardly, substantially as shown and described.

7. A show-window composed of separate divisions arranged one above another and successively projected outwardly one above another, the bottom portion of the bottom division and of the outwardly-projected division thereover forming shelves and said divisions being provided with hinged transparent panels which are adapted to open inwardly, and the bottom portion of the top subdivision which is projected outwardly being partially horizontal and partially upwardly inclined and said portions being also provided with transparent panels one of which is adapted to swing inwardly, said window being also provided at the top, sides and back with mirrors and the back being composed of a hinged door, substantially as shown and described.

8. A show-window comprising a main portion the front of which is parallel with the front of a building and the end thereof adjacent to said door is inclined backwardly and in the direction of the door of said building, said window at both the front, and the said end being composed of different divisions arranged one above another and successively projected outwardly one above another, and the said divisions being provided with horizontal transparent panels adapted to swing inwardly, substantially as shown and described.

9. A show-window comprising a main portion the front of which is parallel with the front of a building and the end thereof adjacent to said door is inclined backwardly and in the direction of the door of said building, said window at both the front and the said end being composed of different divisions arranged one above another and successively projected outwardly one above another, and said divisions being provided with transparent panels adapted to swing inwardly the top and back of said window and one end thereof being also provided with mirrors, substantially as shown and described.

In testimony that I claim the foregoing as my invention I have signed my name, in presence of the subscribing witnesses, this 8th day of April, 1903.

GEO. F. JEFFERSON.

Witnesses:
J. C. LARSEN,
F. A. STEWART.